July 2, 1957 — M. W. WHITESELL — 2,797,725
BACKUP MEANS FOR WORKING ON AUTOMOBILE BODY TOPS
Filed Aug. 10, 1954
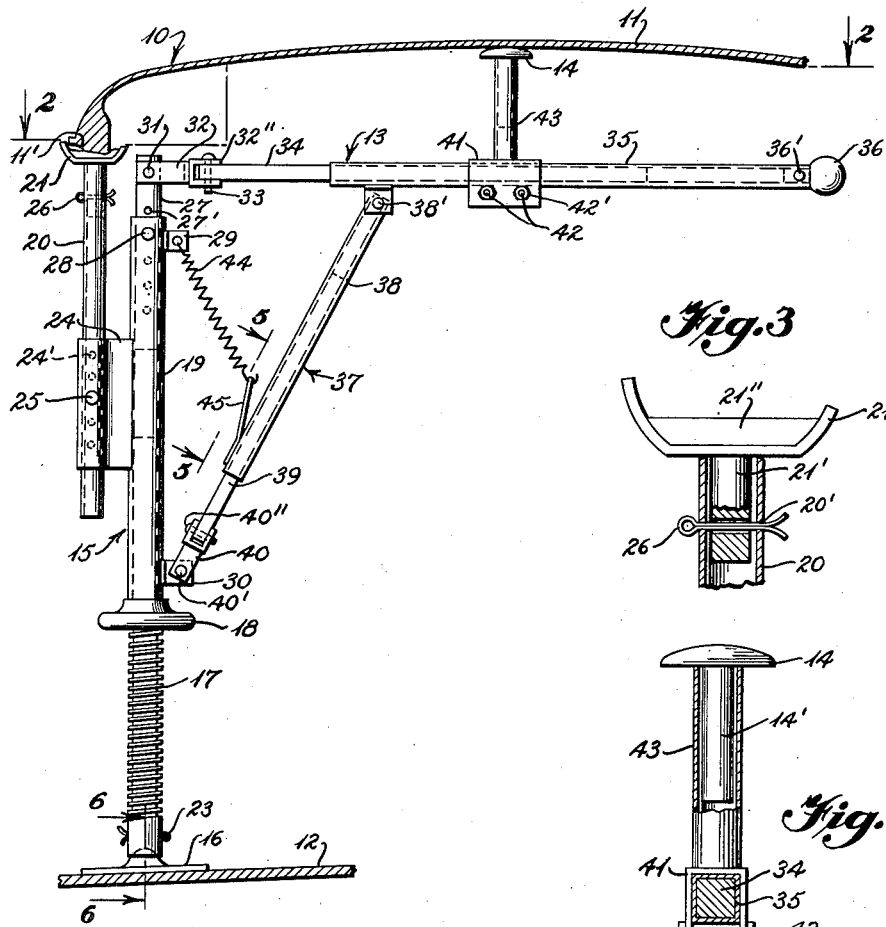
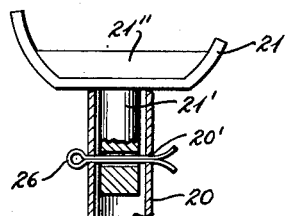
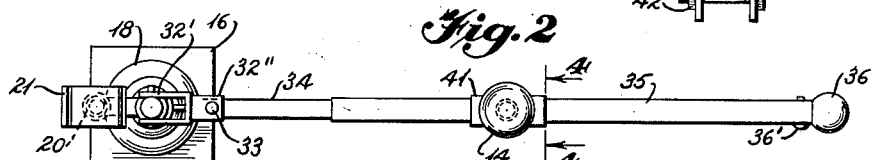
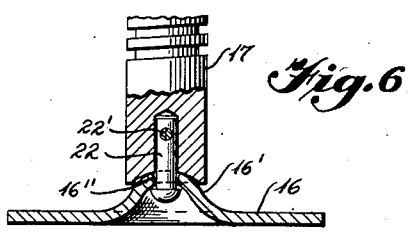
INVENTOR.
Morris W. Whitesell
BY
Beale and Jones
attorneys

United States Patent Office 2,797,725
Patented July 2, 1957

2,797,725

BACKUP MEANS FOR WORKING ON AUTOMOBILE BODY TOPS

Morris W. Whitesell, Waynesboro, Va.

Application August 10, 1954, Serial No. 448,981

13 Claims. (Cl. 153—32)

This invention relates to a support for a back up dolly used in straightening automobile body tops.

It is a common practice in straightening automobile bodies for the mechanic to hold a back up dolly against the inside surface of the bent portion while striking the outside with a mallet to remove dents. In cases of dents in automobile body tops it frequently occurs that the dent is where the mechanic cannot hold a dolly against the dent and reach outside the top to straighten the dent with a mallet. It is necessary that the mechanic himself have direct control of positioning and applying back up pressure on the dolly to carry out a good straightening job otherwise the results will not be satisfactory. In such cases where the dents cannot be properly removed, the top has to be cut off and a new top panel welded in place and the welding seam smoothed and leaded.

It is therefore the primary object of my invention to provide a support for the back up dolly such that the mechanic will have the dolly under his direct control for positioning and applying of back up pressure in removing dents from automobile body tops which heretofore could not be straightened.

A further object of my invention is to provide a support that may be braced into a door or window opening so that the dolly support attached to the brace may be moved to all positions not reached directly by the mechanic's arm.

A still further object of my invention is to provide a vertically extensible support which may be clamped into a door or window opening by having a floor engaging end and an overhead window or door opening engaging end and a transversely extending adjustably positionable arm on which is adjustably supported a back up dolly wherein full control of the dolly support arm is by the mechanic.

Still further objects and the entire scope of applicability of the present invention will become apparent from the detailed description given hereinafter; it should be understood, however, that the detailed description and specific example is given by way of illustration only and, while indicating preferred embodiments of the invention, is not given by way of limitation, since various changes and modifications within the spirit and scope of the invention will become apparent to those skilled in the art from this detailed description.

For a more complete understanding of my invention reference is had to the description and claims taking into account the drawings in which:

Fig. 1 is a side elevation of the dolly brace in position in an automobile body whose floor and top are shown in fragmentary cross section;

Fig. 2 is a plan view along section line 2—2 of Fig. 1;

Fig. 3 is a side elevation view of the saddle which engages the top of a doorway or window way shown mounted in the top of the vertical brace support shown broken away;

Fig. 4 is a side view partly in section of the dolly mounted on its supporting arm as viewed along line 4—4 of Fig. 2;

Fig. 5 is a view along line 5—5 of Fig. 1 showing the adjustable mounting of the spring support; and Fig. 6 is a fragmentary view partly in section of the foot pad support for the vertical brace as taken along line 6—6 of Fig. 1.

Throughout the description like reference numerals refer to similar parts.

An automobile body is generally indicated at 10 having a top 11 and a floor 12. The dolly support according to my invention is generally indicated at 13. The dolly support 13 holds the back up dolly 14 which is provided with a stem 14'.

The dolly support 13 has a vertically adjustable brace 15 comprising a floor pad 16 which universally supports a threaded stem 17, a threaded positioning nut 18 received on stem 17, a sleeve 19 received over the upper end of stem 17 and resting on nut 18, an adjustably positionable saddle support stem 20 and a saddle 21.

The floor pad 16 is formed with a struck up spherical shaped dimple 16' that is apertured at its center 16" to receive a vertically extending pin 22 which has a transverse aperture 22' at its top end. The bottom end of the threaded stem 17 has a vertically extending cavity therein which receives pin 22. A transverse aperture is formed in the lower end of stem 17 so as to extend in alignment with aperture 22' in pin 22 and receive a cotter pin 23. This floor pad mounting of stem 17 provides for universal movement of the stem. Other types of floor pads may equally as well be used to support the vertical brace 15.

Sleeve 19 received over threaded stem 17 is adjustably positioned therealong and tightened by the nut 18. Sleeve 19 has attached thereto a transversely extending lug 24 which has a vertically extending aperture therein that receives the support stem 20 for saddle 21. A plurality of transversely extending apertures 24' are formed in lug 24 which receive a securing pin 25 that extends through a selected aperture and an aperture in stem 20 to position stem 20 with respect to the vertical sleeve 19. Stem 20 is tubular as shown in Fig. 3 and receives saddle pin 21 attached to saddle 21. Stem 20 is apertured at its upper end at 20' as is also saddle pin 21' to receive a cotter pin 26. Saddle 21 is formed with a concave surface which faces upwardly and receives a pad or cushion 21" that forms a rest for the doorway or window way 11' of top 11. Differently shaped saddles 21 may be provided to conform with variously shaped surfaces of doorways and window ways.

It will be observed that vertical brace 15 may first be roughly adjusted by the positioning of support stem 20 in apertured lug 24 and secured in adjusted position therein by pin 25. Following this rough positioning, the brace is clamped into position between doorway and floor by setting up on nut 18 which supports sleeve 19. This forms a rigid vertically or generally vertically extending brace from which is supported the back up dolly 14.

Positioned in the upper end of sleeve 19 is a vertical post 27 which has a plurality of spaced apart transverse apertures 27' therein. The upper end of sleeve 19 has a plurality of spaced apart apertures 19' formed therein to receive a securing pin 28 which holds post 27 in a vertically adjusted position extending from sleeve 19. There is also attached to sleeve 19, on the opposite side from lug 24, an apertured lug 29 near the top and another apertured lug 30 near the bottom end.

Pivotally mounted on the upper end of post 27 as by a transverse pin 31 is a double ended bifurcated coupling member wherein one end has bifurcations 32', see Fig. 2, while the other end has bifurcations 32" oriented 90° from the bifurcations 32'. Bifurcations 32" have pivotally attached thereto, as by pin 33, a cross arm 34 which is rectangular or square shape in cross section. Received over the end of cross arm 34 in a telescopic manner is cross sleeve 35 which has mounted on its outer end a hand grasp ball member 36 as by a pin 36'.

A diagonal support member 37 made up of telescopic members 38 and 39 serves as a brace between vertical support 15 and cross arm 13. Telescope member 39 is attached at its lower end to lug 30 by a double ended bifurcated member 40, similar to member 32, as by pivot pins 40' and 40". Telescopic member 38 is tubular and is pivotally attached at its upper end by pin 38' to an apertured lug 35' depending from the inboard end of telescopic sleeve 35.

It will be noted that through coupling members 32 and 40, the telescopic cross arm 13 and the diagonal telescopic arm 37, the cross arm 13 can be universally moved. This universal movement is under the control of the mechanic who grasps the hand ball end 36 with one hand while manipulating his mallet with his other hand.

The above described mounting of cross arm 13 on vertical support 15 serves as a support for the back up dolly 14 which is adjustably mounted on telescopic cross arm member 35. A U-shaped slide member 41 is slidably received on telescopic tubular member 35 and the legs of the U-shaped member 41 depend below cross member 35 as shown in Figures 1 and 4. A pair of takeup bolts 42 having securing nuts 42' thereon clamp the slide member 41 in adjusted position along cross arm 35. Secured to the bite of the U-shaped member 41, as by welding, is a vertically extending tubular member 43 which receives the stem 14' of the back up dolly 14.

To relieve the mechanic of continually holding up the cross arm 13, I provide a tension spring 44 which has its upper end secured to lug 29 on the sleeve 19 of vertical brace 15 while its bottom end hooks into any one of a number of spaced apertures 45' in a strap member attached to the telescopic diagonal sleeve 38 toward its lower end. By attaching the lower end of spring 44 progressively in the apertures 45' toward the lower end of strap 45, a progressively greater pull is exerted by spring 44 on the diagonal support member 37 thus pulling telescopic sleeve 38 upward to support cross arm 34, 35.

In operation, the vertical brace 15 is positioned adjacent a doorway or a windowway and tightened, first by the rough setting of support stem 20 in apertured lug 24 by the pin 25 and second by tightening nut 18 on threaded stem 17. It will be noted that the lug 24 is offset with respect to the threaded stem 17 and thus assisting the positioning of the vertical brace 15 in a windowway. So also in positioning the vertical brace 15, the foot pad 16 may be moved inboard and the brace 15 may be canted but still rigidly set in position. After placing the brace 15, spring 44 may be adjustably coupled to any one of the apertures 45' in strap 45 and then by slackening off on nuts 42' the dolly support member 41 may be positioned along cross arm 35. It is not necessary to fully tighten nuts 42' on their bolts 42 as the U-shaped slide member is to some extent frictionally held in a selected position on cross arm member 34, 35.

I have provided a support for a back up dolly that is easily and quickly installed in an automobile body and which through its telescopic cross arm 34, 35 and telescopic diagonal support 37 and their universal couplings to the vertical support 35 affords a highly flexible and easily positionable support for the back up dolly 14.

I claim as my invention:

1. A back up dolly support for straightening automobile body tops comprising, in combination, a vertically extensible support member positionable between and in braced contact with the floor and the top of a doorway or a windowway of an automobile, means on said vertically extensible support member for holding same in extended and braced position, a generally transversely extending cross support arm pivotally attached at one end thereof towards the top of said vertically extensible support for universal movement, a diagonal extensible and retractable support member for said cross arm, means connecting one end of said diagonal support member to the cross arm and means connecting the other end thereof to the vertical support in a pivotal manner to permit said universal movement of the cross arm about said vertical extensible support, a back up dolly support member attached to said cross support arm and a back up dolly mounted on said back up dolly support member, and extending vertically therefrom, said cross arm having a hand grasp portion at the end thereof opposite to said pivotally connected end.

2. A back up dolly support for straightening automobile body tops comprising, in combination, a vertically extensible support member positionable between and in braced contact with the floor and the top of a doorway or windowway of an automobile, means on said vertically extensible support member for holding same in extended and braced position, a generally transversely extending cross support arm pivotally attached at one end thereof toward the top of said vertically extensible support for universal movement, a diagonal extensible and retractable support member for said cross arm, means connecting one end of said diagonal support member to the cross arm and means connecting the other end thereof to the vertical support in a pivotal manner to permit universal movement of the cross arm about said vertical extensible support, biasing means connected adjacent the top end of said vertically extensible support member and intermediate the ends of said diagonal support member pulling said diagonal support member upwardly, a back up dolly support member attached to said cross support arm and a back up dolly mounted on said back up dolly support member and extending vertically therefrom, said cross arm having a hand grasp portion at the end thereof opposite to said pivotally connected end.

3. A back up dolly support for straightening automoblie body tops comprising, in combination, a vertically extensible support positionable between and in braced contact with the floor and the top of a doorway or a windowway of an automobile, said extensible support comprising a floor engaging pad, a first member pivotally connected to the floor pad, a second member connected to the first member for telescopic movement therewith, a support post connected to said second member and having a top of doorway or windowway engaging means attached thereto and means connected with said first and second members of the extensible support for holding said first and second members in a telescopic position whereby said vertically extensible support is braced between the floor of the automobile body and the top of a doorway or a windowway of the body, a generally transversely extending cross arm pivotally attached at one end thereof toward the top of said second member of the vertical support for universal movement, a telescopic diagonal support member for said cross arm, means connecting the top and bottom ends of said diagonal support respectively to said cross member and said vertical support to permit said universal movement of said cross arm, a back up dolly support member attached to said cross arm and a back up dolly mounted on said back up dolly support member and extending upwardly therefrom, said cross arm having a hand grasp portion at the end thereof opposite to said pivotally connected end.

4. The apparatus according to claim 3 wherein said second member of the vertically extensible support has a cross arm support member telescopically mounted on the upper end thereof and said generally transversely extending cross arm is pivotally connected to the upper end of said cross arm support member for universal movement.

5. The apparatus according to claim 4 wherein said telescopic diagonal member has a lower and upper member telescopically connected together and including biasing means connected adjacent the top end of said second member of the vertically extensible support and adjacent the lower end of said upper telescopic member of the diagonal support.

6. The apparatus according to claim 5 wherein said generally transversely extending cross arm comprises an inner member and an outer member telescoped together, said upper member of said diagonal support being pivotally connected at its top end to said outer telescopic member of the cross arm.

7. The apparatus according to claim 6 including an attachment means for the biasing means at the lower end of said upper telescopic member of the diagonal support for adjustably positioning the connection of the biasing means to the lower end of said upper telescopic diagonal support member whereby a selected tension is applied to said diagonal support member.

8. A back up dolly support for straightening automobile body tops comprising, in combination, a vertically extensible support positionable between the floor and the top of a doorway or a windowway of an automobile, said extensible support comprising a floor engaging pad, a first member threaded on its outside and pivotally connected at its lower end to said floor pad, a nut threadedly received on said first member, a second member slidably received over the upper end of the first member and resting on said nut whereby positioning of said nut on the first member moves said second member with respect to the first member, said second member having a cross arm support post adjustably positioned on its upper end and a transversely extending lug attached to one side of the second member intermediate its ends, a vertical support post adjustably connected to said transverse lug on the second member and extending approximately parallel to second member for telescopic adjustment therewith, said vertical support post having a top of doorway or windowway engaging means attached to the top thereof whereby said vertical support may be braced between the floor of an automobile and the top of a doorway or windowway, a generally transversely extending cross arm pivotally connected at one end to the upper end of said cross arm support post, said cross arm comprising a first elongated member pivotally attached to said cross arm support post and a second elongated member telescopic therewith and having a hand grasp portion on its end opposite to said first member, biasing means connected between said vertically extensible support and said cross arm for urging said cross arm upward and in an approximately horizontal position and still permitting swinging movement about the pivotal connection of the cross arm and a back up dolly slidably mounted on said second member of the cross arm and extending vertically therefrom for engagement with the inner surface of an automobile top.

9. The apparatus according to claim 8 wherein said first and second telescopic member of the cross arm are of complementary polygonal shaped cross section whereby one of said telescopic members of the cross arm may not rotate with respect to the second member.

10. The apparatus according to claim 8 wherein said biasing means disposed between said vertically adjustable support member and said cross arm comprises an elongated telescopic diagonal support attached to and extending between the second member of said vertically extensible support and the cross arm and comprising a lower elongated member pivotally attached at its lower end to said second member of the vertically adjustable support, an upper member telescopic with said lower member and pivotally connected at its upper end to said cross arm and an elongated tension spring connected at one end to the upper portion of the second member of the vertically extensible support and at its lower end to the lower portion of said upper telescopic member of the diagonal support.

11. The apparatus according to claim 10 including adjustable attaching means for the lower end of the tension spring attached to the upper telescopic member of the diagonal support for attaching the lower end of the tension spring in an adjusted position closer to or farther away from the lower end of said upper telescopic member of the diagonal support.

12. A back up dolly support for straightening automobile body tops comprising, in combination, a vertical extensible support member positionable between and in braced contact with a bottom and top portion of the automobile body, a generally transversely extending cross support arm pivotally attached at one end thereof towards the top of said vertically extensible support for universal movement, a back up dolly support member attached to said cross arm and a back up dolly mounted on said back up dolly support member and extending vertically therefrom, said cross arm having a hand grasp portion at the end thereof opposite to said pivotally connected end and resilient biasing means disposed between said cross arm and said vertically extensible support and urging said cross arm into a horizontal position but permitting said universal swinging movement thereof.

13. A back up dolly support for straightening automobile body tops comprising, in combination, an extensible brace means positionable within the automobile body between and in braced contact with two fixed parts of the automobile body, a generally transversely extending cross support arm pivotally attached at one end thereof to said extensible brace means for universal movement, a back up dolly mounted on said back up dolly support member and extending vertically therefrom, said cross arm having a hand grasp portion at the end thereof opposite to said pivotally connected end and a telescopic diagonal member attached at one end to said extensible brace means and at the other end to said cross support arm in a pivotal manner permitting said universal swinging movement of the cross arm.

References Cited in the file of this patent

UNITED STATES PATENTS

| | | |
|---|---|---|
| 2,151,063 | Weaver | Mar. 21, 1939 |
| 2,185,550 | Gerdes | Jan. 2, 1940 |
| 2,194,991 | Voges | Mar. 26, 1940 |
| 2,274,032 | Blair | Feb. 24, 1942 |
| 2,517,547 | Derginer et al. | Aug. 8, 1950 |
| 2,543,347 | Bartlo | Feb. 27, 1951 |